(12) United States Patent
Shinagawa et al.

(10) Patent No.: US 12,394,809 B2
(45) Date of Patent: *Aug. 19, 2025

(54) FUEL CELL SHIP

(71) Applicant: Yanmar Holdings Co., Ltd., Osaka (JP)

(72) Inventors: Manabu Shinagawa, Osaka (JP); Takehiro Maruyama, Osaka (JP); Yasuyoshi Yamaguchi, Osaka (JP); Takuya Hiraiwa, Osaka (JP); Yukihiko Kimura, Kunisaki (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 618 days.

This patent is subject to a terminal disclaimer.

(21) Appl. No.: 17/830,144

(22) Filed: Jun. 1, 2022

(65) Prior Publication Data

US 2022/0393201 A1 Dec. 8, 2022

(30) Foreign Application Priority Data

Jun. 2, 2021 (JP) .................................. 2021-092712

(51) Int. Cl.
*H01M 8/04082* (2016.01)
*B60L 50/72* (2019.01)
(Continued)

(52) U.S. Cl.
CPC ......... *H01M 8/04201* (2013.01); *B60L 50/72* (2019.02); *B63H 21/17* (2013.01);
(Continued)

(58) Field of Classification Search
CPC .. B63H 21/00; B63H 21/17; B63H 2021/003; B63H 21/38; B63B 21/21; B63B 11/04;
(Continued)

(56) References Cited

U.S. PATENT DOCUMENTS 8,123,577 B2 * 2/2012 Riggs .................... H01M 12/06
440/6
8,683,937 B2 * 4/2014 Sancoff .................... B63G 8/36
114/61.15
(Continued)

FOREIGN PATENT DOCUMENTS

JP 2017128202 A 1/2016
JP 2018-092815 6/2018

OTHER PUBLICATIONS

European Search Report dated Jun. 5, 2023 issued in EP Application 22175809.7.

*Primary Examiner* — Daniel V Venne
(74) *Attorney, Agent, or Firm* — NORTON ROSE FULBRIGHT US LLP (57) ABSTRACT

A fuel cell ship includes a fuel cell that generates electric power by an electrochemical reaction of fuel, a propulsion device that generates propulsive force on a hull by electric power supplied from the fuel cell, a fuel supply pipe through which the fuel is supplied from a fuel tank housing the fuel to the fuel cell, a duct compartment that houses a part of the fuel supply pipe, a vent pipe that communicates with the duct compartment, and a fuel filling port that serves as an inlet for filling the fuel tank with the fuel. The fuel filling port is provided in the duct compartment.

9 Claims, 6 Drawing Sheets

(51) Int. Cl.
*B63H 21/17* (2006.01)
*H01M 8/04089* (2016.01)
*H01M 8/0444* (2016.01)
*H01M 8/04746* (2016.01)
*H01M 8/10* (2016.01)

(52) U.S. Cl.
CPC ... *H01M 8/04089* (2013.01); *H01M 8/04455* (2013.01); *H01M 8/04753* (2013.01); *B60L 2200/32* (2013.01); *H01M 2008/1095* (2013.01); *H01M 2250/20* (2013.01)

(58) Field of Classification Search
CPC .............. B63B 11/02; H01M 8/04947; H01M 8/04679; H01M 8/04753; H01M 8/04865; H01M 2250/20; H01M 8/249; H01M 8/0444; H01M 16/006; H01M 8/04932; H01M 8/04089; H01M 8/04201; H01M 8/04664; H01M 8/04955; H01M 50/35; H01M 2220/20; H01M 8/2475; H01M 8/04447; H01M 8/0494; H01M 8/04388; F17C 2201/0109; F17C 2201/035; F17C 2201/056; F17C 2205/0103; F17C 2205/0142; F17C 2205/0176; F17C 2205/0335; F17C 2221/012; F17C 2223/0123; F17C 2223/036; F17C 2250/0452; F17C 2260/038; F17C 2260/042; F17C 2270/0105; F17C 1/002; F17C 13/084; B63J 2/02; B63J 2/06; B63J 2/10; B60L 58/13; B60L 2240/54; B60L 50/71; B60L 2200/32; B60L 3/0053; B60L 50/70; B60L 58/30; B60R 25/042; Y02E 60/50; Y02T 90/40; Y02T 70/50

USPC ............................................ 440/1; 180/65.22

See application file for complete search history.

(56) References Cited

U.S. PATENT DOCUMENTS

| | | | |
|---|---|---|---|
| 10,364,009 B2* | 7/2019 | Sako | H01M 8/04089 |
| 2006/0009092 A1* | 1/2006 | Krietzman | B63H 21/17 |
| | | | 440/6 |
| 2006/0012248 A1* | 1/2006 | Matsushita | B60L 58/40 |
| | | | 307/10.1 |
| 2007/0122667 A1* | 5/2007 | Kelley | C01B 3/382 |
| | | | 429/513 |
| 2015/0280260 A1* | 10/2015 | Lee | H01M 8/04231 |
| | | | 429/414 |
| 2018/0155000 A1 | 6/2018 | Sako | |

* cited by examiner

FUEL CELL SHIP

CROSS-REFERENCE TO RELATED APPLICATIONS

This application is claims priority under 35 U.S.C. § 119 to JP Application No. 2021-092712 filed Jun. 2, 2021, the entire contents of which are hereby incorporated by reference.

TECHNICAL FIELD

The present invention relates to a fuel cell ship.

BACKGROUND ART

In the related art, a fuel cell ship in which a fuel gas (for example, hydrogen gas) is supplied from a fuel tank to a fuel cell and a propulsion device is driven by electric power generated by the fuel cell has been proposed (see, for example, Patent Document 1).

PRIOR ART DOCUMENT

Patent Document

Patent Document 1: Japanese Unexamined Patent Application Publication No. 2018-92815

SUMMARY OF INVENTION

Technical Problem

In a fuel cell ship, it may be required not to arrange electrical equipment (such as ventilation fans) around a portion through which a flammable fuel gas passes, for example, around a fuel gas filling port. This is because the arranged electrical equipment can ignite the fuel gas. Hereinafter, a portion through which the fuel gas passes may be referred to as a hazardous site, and a location around the hazardous site where electrical equipment cannot be arranged may be referred to as a hazardous location. In a fuel cell ship, if hazardous sites are scattered, which results in expansion of the hazardous location, the area in which electrical equipment can be arranged becomes narrow. As a result, the degree of freedom of arranging electrical equipment is reduced.

The present invention has been made to solve the above-described problem, and an object the present invention is to provide a fuel cell ship by which the hazardous location where electrical equipment cannot be arranged is narrowed, and the degree of freedom of arranging the electrical equipment can be increased.

Solution to Problem

A fuel cell ship according to an aspect of the present invention is a fuel cell ship including a fuel cell that generates electric power by an electrochemical reaction of fuel, and a propulsion device that generates propulsive force on a hull by electric power supplied from the fuel cell. The fuel cell ship further includes a fuel supply pipe through which the fuel is supplied from a fuel tank housing the fuel to the fuel cell, a duct compartment that houses a part of the fuel supply pipe, a vent pipe that communicates with the duct compartment, and a fuel filling port that serves as an inlet for filling the fuel tank with the fuel. The fuel filling port is provided in the duct compartment.

Advantageous Effects of Invention

According to the above configuration, it is possible to narrow the hazardous location in which electrical equipment cannot be arranged, and increase the degree of freedom of arranging the electric equipment.

DESCRIPTION OF EMBODIMENTS

An embodiment of the present invention will be described below based on the drawings. In this description, direction is defined as follows. First, a direction from a stern to a bow of a fuel cell ship is "front", and a direction from the bow to the stern is "rear". A horizontal direction perpendicular to a front-rear direction is defined as a left-right direction. At this time, when the fuel cell ship is moving forward, the left side is defined as "left" and the right side is defined as "right" when viewed from the operator. The upstream side in the gravity direction perpendicular to the front-back direction and the left-right direction is referred to as "up", and the downstream side is referred to as "down".

[1. Schematic Configuration of Fuel Cell Ship]

Figure 1:
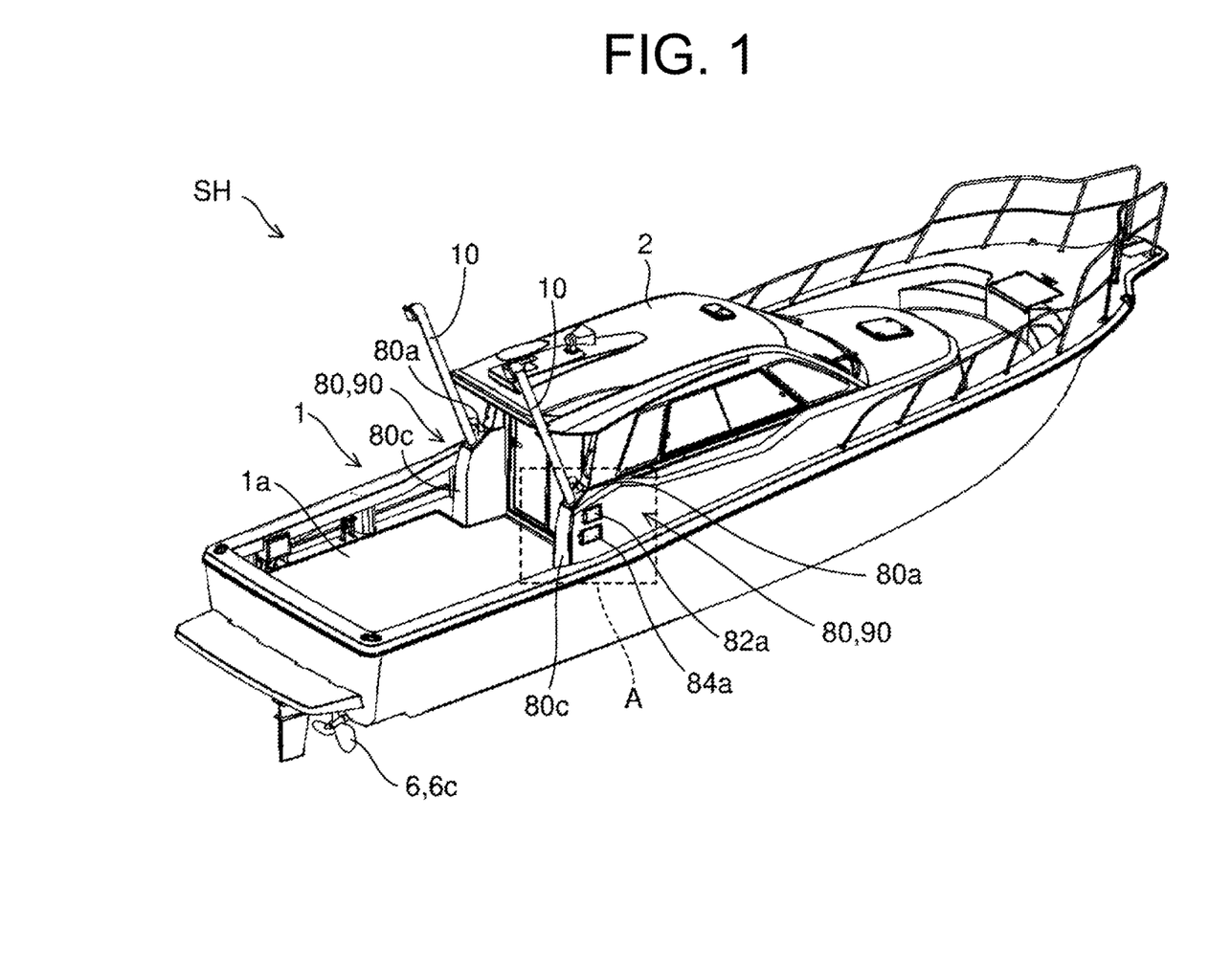
FIG. 1 is a rear perspective view illustrating an appearance of a fuel cell ship according to an embodiment of the present invention.
Figure 2:
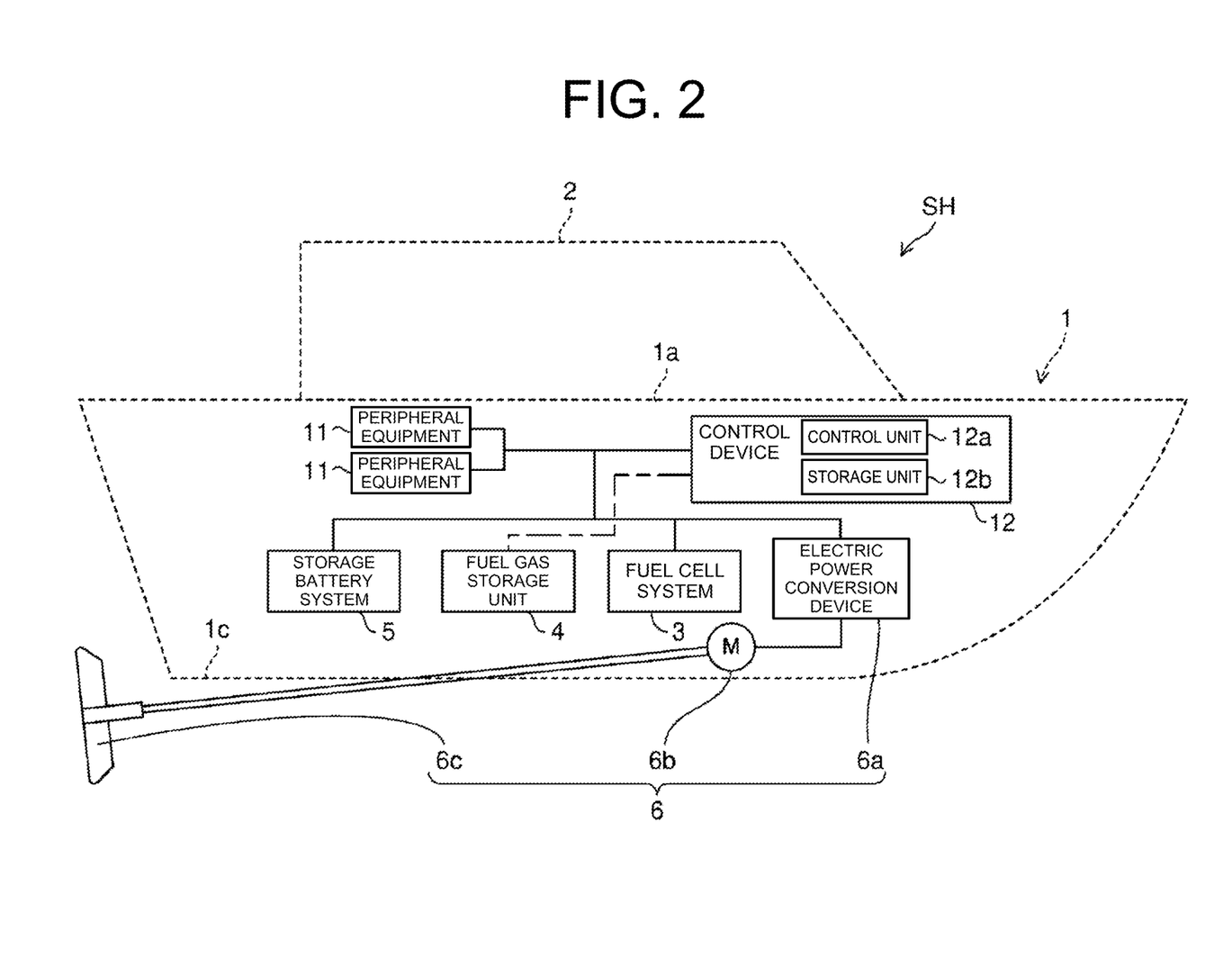
FIG. 2 is an explanatory diagram illustrating a schematic configuration of the fuel cell ship.

Firstly, a fuel cell ship SH according to the present embodiment will be described with reference to FIGS. 1 and 2. FIG. 1 is a rear perspective view illustrating an appearance of the fuel cell ship SH. FIG. 2 is an explanatory diagram illustrating a schematic configuration of the fuel cell ship SH. The fuel cell ship SH includes a hull 1 and a cabin 2. The cabin 2 is arranged on top of the hull 1.

The fuel cell ship SH further includes a fuel cell system 3, a fuel gas storage unit 4, a storage battery system 5, a propulsion device 6, a plurality of pieces of peripheral equipment 11, and a control device 12. In FIG. 2, a control signal or a high voltage power supply line is indicated by a solid line, and a control signal or a low voltage power supply line is indicated by a dashed line.

The fuel cell system 3 functions as a main power supply. The fuel cell system 3 consumes a fuel gas to generate electric power (specifically, DC electric power). The fuel gas is an example of a fuel, for example, a combustible gas. Typically, the fuel gas is hydrogen gas. The fuel cell system 3 supplies generated electric power to the propulsion device 6 and the peripheral equipment 11. The fuel cell system 3 can also supply electric power to the storage battery system 5 to charge the storage battery system 5.

The fuel gas storage unit 4 stores the fuel gas to be supplied to the fuel cell system 3. The supply of fuel gas from the fuel gas storage unit 4 to the fuel cell system 3 is performed via a fuel gas supply pipe 32 described later (see FIG. 3).

The storage battery system 5 includes a storage battery. The storage battery is, for example, a lithium secondary battery, but may also be a nickel-cadmium storage battery, a nickel-hydrogen storage battery, or the like. The storage battery system 5 functions as an auxiliary power source for supplying the stored electric power (specifically, DC electric power) to the propulsion device 6 and the peripheral equipment 11. By the storage battery system 5 functioning as an auxiliary power source, it is possible to compensate for a shortage of electric power supplied from the fuel cell system 3 to the propulsion device 6 or the like. The storage battery system 5 may supply electric power to the control device 12.

The propulsion device 6 is driven by electric power supplied from a fuel cell 31 (described later) (see FIG. 3) of the fuel cell system 3, and generates a propulsive force on the hull 1. That is, the fuel cell ship SH includes the propulsion device 6 that generates a propulsive force on the hull 1 by the electric power supplied from the fuel cell 31.

The propulsion device 6 may be driven only by the electric power supplied from the storage battery included in the storage battery system 5, or may be driven by the electric power supplied from both the fuel cell 31 and the storage battery. That is, the propulsion device 6 may be driven by the electric power supplied from at least one of the fuel cell and the storage battery to generate the propulsive force on the hull 1.

The propulsion device 6 includes an electric power conversion device 6a, a propulsion motor 6b, and a propeller 6c. The electric power conversion device 6a converts the electric power supplied from the fuel cell system 3 into electric power according to the specifications of the propulsion motor 6b. For example, the electric power conversion device 6a converts DC electric power into AC electric power. In this case, the electric power conversion device 6a has, for example, an inverter. The propulsion motor 6b is driven by electric power (for example, AC electric power) supplied from the electric power conversion device 6a. When the propulsion motor 6b is driven, the rotational force of the propulsion motor 6b is transmitted to the propeller 6c. As a result, the propeller 6c rotates, and a propulsive force is generated on the hull 1. A configuration is also possible in which a marine gear is provided between the propulsion motor 6b and the propeller 6c.

Examples of the peripheral equipment 11 include a compressor, a solenoid valve, and a pump. Examples of the peripheral equipment 11 also include electrical equipment such as lighting equipment and air conditioning equipment, but the types of peripheral equipment 11 are not particularly limited.

The control device 12 controls the fuel cell system 3, the fuel gas storage unit 4, the storage battery system 5, the propulsion device 6, and the plurality of pieces of peripheral equipment 11. The control device 12 is composed of, for example, one or two or more computers. The computer is, for example, a Programmable Logic Controller (PLC), but may also be an Electronic Control Unit (ECU). The control device 12 is supplied with electric power from a battery (for example, a lead battery) (not illustrated) or the storage battery of the storage battery system 5.

The control device 12 has a control unit 12a and a storage unit 12b. The control unit 12a includes a processor such as a Central Processing Unit (CPU). The storage unit 12b includes a storage device and stores data and computer programs. Specifically, the storage unit 12b includes a main storage device such as a semiconductor memory and an auxiliary storage device such as a semiconductor memory, a solid state drive, and/or a hard disk drive. The storage unit 12b may also include removable media. The storage unit 12b corresponds to an example of a non-transitory computer-readable storage medium.

The processor of the control unit 12a executes a computer program stored in the storage device of the storage unit 12b, to control the fuel cell system 3, the fuel gas storage unit 4, the storage battery system 5, the propulsion device 6, and the plurality of pieces of peripheral equipment 11.

[2. Internal Structure of Fuel Cell Ship]

Figure 3:
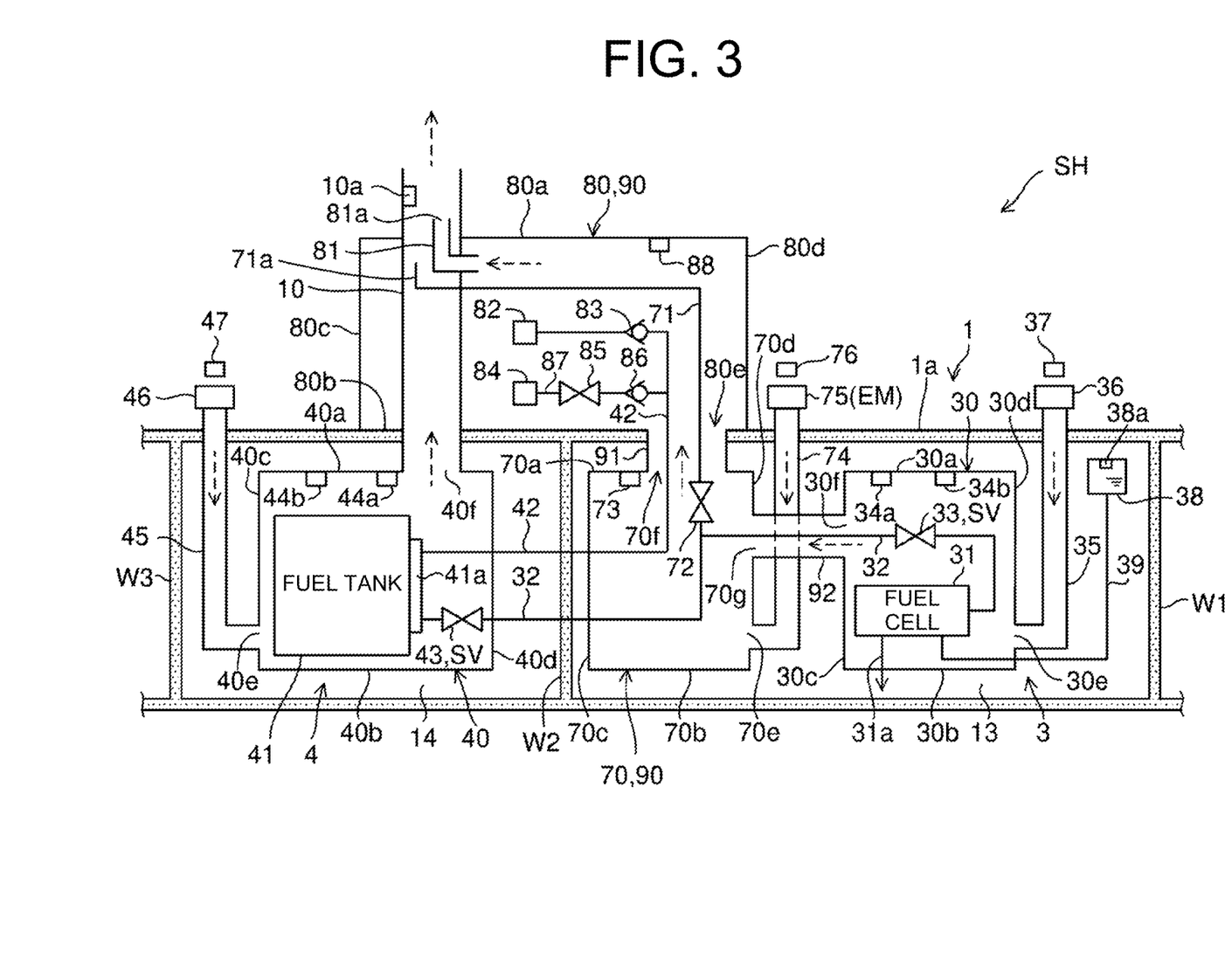
FIG. 3 is an explanatory diagram schematically illustrating an internal structure of the fuel cell ship.

Next, an internal structure of the fuel cell ship SH will be described with reference to FIG. 3. FIG. 3 is an explanatory diagram schematically illustrating the internal structure of the fuel cell ship SH. In FIG. 3, the air flow is indicated by a dashed line arrow. Each member is illustrated in FIG. 3 in which the right side of the drawing is the bow side and the left side of the drawing is the stern side. However, the position of each member is not limited to the position illustrated in FIG. 3 as long as the connection relationship between each member is maintained.

The fuel cell ship SH includes an engine room 13 and a fuel room 14. The engine room 13 and the fuel room 14 are arranged below a deck 1a of the hull 1. The engine room 13 is located on the bow side with respect to the fuel room 14. Below the deck 1a, partition walls W1, W2 and W3 are located in order from the bow side to the stern side. The engine room 13 is separated from other spaces by the partition walls W1 and W2. The fuel room 14 is separated from other spaces by the partition walls W2 and W3. The partition walls W1 to W3 are made of, for example, fiber reinforced plastics (FRP), but may be iron plates.

(2-1. Configuration of Fuel Cell System)

The fuel cell system 3 of the fuel cell ship SH is located in the engine room 13. The fuel cell system 3 includes the fuel cell 31, the fuel gas supply pipe 32, and a fuel cell side shutoff valve 33. The fuel cell side shutoff valve 33 is an example of the peripheral equipment 11 (see FIG. 2).

The fuel cell 31 generates electric power (specifically, DC electric power) by an electrochemical reaction between the fuel gas being an example of fuel and an oxidant gas. Typically, the oxidant gas is air and the oxidant is oxygen. That is, the fuel cell ship SH includes the fuel cell 31 that generates electric power by an electrochemical reaction of fuel.

The fuel cell 31 is a fuel cell stack composed of a plurality of stacked cells. For example, each cell of the fuel cell 31 has a solid polymer electrolyte membrane, an anode electrode, a cathode electrode, and a pair of separators. The solid polymer electrolyte membrane is sandwiched between the anode electrode and the cathode electrode. The anode electrode is a negative electrode (fuel electrode). The anode electrode includes an anode catalyst layer and a gas diffusion layer. The cathode electrode is a positive electrode (air electrode). The cathode electrode includes a cathode catalyst layer and a gas diffusion layer. The anode electrode, the solid polymer electrolyte membrane, and the cathode electrode form a Membrane-Electrode Assembly (MEA). The pair of separators sandwich the membrane-electrode assembly. Each separator has a plurality of grooves. Each groove of one separator forms a flow path for the fuel gas. Each groove of the other separator forms a flow path for the oxidant gas.

In the configuration described above of the fuel cell 31, hydrogen included in the fuel gas is decomposed into hydrogen ions and electrons by the catalyst on the anode electrode side. Hydrogen ions pass through the solid polymer electrolyte membrane and move to the cathode electrode side. On the other hand, the electrons move to the cathode electrode side through an external circuit. As a result, an electric current is generated (electricity is generated). On the cathode electrode side, oxygen included in the oxidant gas combines with the electrons that flow through the external circuit and hydrogen ions that pass through the solid polymer electrolyte membrane to generate water. The generated water is discharged to the outside of the ship via a discharge pipe 31a.

The fuel cell 31 supplies generated electric power to the propulsion device 6 and the peripheral equipment 11 which are illustrated in FIG. 2. The fuel cell 31 may indirectly supply generated electric power to the propulsion device 6 and the peripheral equipment 11 via a circuit such as a DC/DC converter or the like.

The fuel gas supply pipe 32 is a fuel supply pipe for supplying, to the anode electrode of the fuel cell 31, fuel (for example, the fuel gas) stored in a fuel tank 41 (described later) of the fuel gas storage unit 4. That is, the fuel cell ship SH includes the fuel gas supply pipe 32 as a fuel supply pipe through which fuel is supplied to the fuel cell 31 from the fuel tank 41 that houses the fuel.

The fuel cell side shutoff valve 33 is an example of a shutoff valve SV that opens or closes the flow path of the fuel gas supply pipe 32. The opening and closing of the fuel cell side shutoff valve 33 is controlled by the control unit 12a (see FIG. 2). Specifically, the fuel cell side shutoff valve 33 switches between supplying the fuel gas from the fuel tank 41 to the fuel cell 31 and stopping the supply of fuel gas based on the control of the control unit 12a. Although only one fuel cell side shutoff valve 33 is provided in the fuel gas supply pipe 32 in a fuel cell compartment 30 (described later), two or more may be provided.

The fuel cell ship SH further includes the fuel cell compartment 30. The fuel cell compartment 30 is a housing body for housing the fuel cell 31. The fuel cell compartment 30 is arranged in the engine room 13.

The fuel cell compartment 30 has a hollow shape. For example, the fuel cell compartment 30 has a hollow and substantially rectangular parallelepiped shape. In this case, the outer walls of the fuel cell compartment 30 include, for example, a top wall 30a, a bottom wall 30b, a front wall (not illustrated), a back wall (not illustrated), a side wall 30c, and a side wall 30d. However, the top surface, bottom surface, front surface, back surface, and side surfaces of the fuel cell compartment 30 can be arbitrarily determined. The shape of the fuel cell compartment 30 is not particularly limited as long as the fuel cell compartment 30 has a space that can house the fuel cell 31. The fuel cell compartment 30 can also be considered as a container, chamber, or box for housing the fuel cell 31. The material of the outer wall of the fuel cell compartment 30 is, for example, FRP, but may be an iron plate.

A cell compartment air supply port 30e with an opening is provided on the side wall 30d of the fuel cell compartment 30. The cell compartment air supply port 30e is connected to a cell compartment air supply pipe 35, which will be described later. The cell compartment air supply port 30e may be provided on an outer wall other than the side wall 30d in the fuel cell compartment 30.

On the other hand, a cell compartment exhaust port 30f with an opening is provided on the side wall 30c of the fuel cell compartment 30. The cell compartment exhaust port 30f communicates with a duct compartment 90, which will be described later. The cell compartment exhaust port 30f may be provided on an outer wall other than the side wall 30c in the fuel cell compartment 30.

The fuel cell compartment 30 has an interior that is a closed space, with the exception of the cell compartment air supply port 30e and the cell compartment exhaust port 30f.

A part of the fuel gas supply pipe 32 described above and the fuel cell side shutoff valve 33 are housed in the fuel cell compartment 30. The fuel cell compartment 30 further houses a cell compartment internal gas detector 34a and a cell compartment internal fire detector 34b.

The cell compartment internal gas detector 34a is a fuel gas detector arranged inside the fuel cell compartment 30. For example, if the fuel gas is hydrogen gas, the cell compartment internal gas detector 34a includes a hydrogen gas detection sensor.

The cell compartment internal gas detector 34a is arranged on an inner surface of the top wall 30a located at an upper part of the fuel cell compartment 30. Hydrogen gas as the fuel gas is lighter than air and rises. Therefore, by arranging the cell compartment internal gas detector 34a on the top wall 30a of the fuel cell compartment 30, a leaked fuel gas can be reliably detected by the cell compartment internal gas detector 34a even if the fuel gas leaks in the fuel cell compartment 30. The installation position of the cell compartment internal gas detector 34a may be located on the most downstream side of the flow path through which the fuel gas flows when the fuel gas leaks in the fuel cell compartment 30.

If the cell compartment internal gas detector 34a detects the fuel gas in the fuel cell compartment 30, a detection signal is sent from the cell compartment internal gas detector 34a to the control unit 12a. As a result, the control unit 12a can control the fuel cell side shutoff valve 33 provided in the fuel gas supply pipe 32 to stop the supply of fuel gas from the fuel tank 41 to the fuel cell 31.

The cell compartment internal fire detector 34b is a fire detector arranged inside the fuel cell compartment 30. The cell compartment internal fire detector 34b includes, for example, one or more sensors among a smoke sensor for detecting smoke, a heat sensor for detecting heat, and a flame sensor for detecting flame. The cell compartment internal fire detector 34b may include a thermocouple type fire detector.

The cell compartment internal fire detector 34b is arranged on an inner surface of the top wall 30a located at an upper part of the fuel cell compartment 30. In the unlikely event that a fire occurs inside the fuel cell compartment 30, the cell compartment internal fire detector 34b detects the fire and outputs a detection signal indicating that a fire has occurred to the control unit 12a. In this case, the control unit 12a can control the fuel cell side shutoff valve 33 to stop the supply of fuel gas from the fuel tank 41 to the fuel cell 31. As a result, in the fuel cell compartment 30, the risk of explosion due to ignition of the fuel gas can be reduced as much as possible.

The cell compartment air supply pipe 35 is connected to the fuel cell compartment 30. The cell compartment air supply pipe 35 extends from the cell compartment air supply port 30e of the fuel cell compartment 30, to the deck 1a and is exposed from the upper surface of the deck 1a.

A cell compartment air supply device 36 and a cell compartment external gas detector 37 are arranged at an end portion on the deck 1a side of the cell compartment air supply pipe 35. The cell compartment air supply device 36 and the cell compartment external gas detector 37 are located above the deck 1a.

The cell compartment air supply device 36 includes, for example, an inexpensive non-explosion-proof air supply fan, but may include an explosion-proof air supply fan. The drive of the cell compartment air supply device 36 is controlled by the control unit 12*a*. One or more filters (not illustrated) may be arranged in the cell compartment air supply device 36. The filter removes, for example, dust or sea salt particles.

The cell compartment air supply device 36 supplies air outside the fuel cell compartment 30 to the inside of the fuel cell compartment 30 via the cell compartment air supply pipe 35 and the cell compartment air supply port 30*e*. The air inside the fuel cell compartment 30 is discharged to the duct compartment 90 via the cell compartment exhaust port 30*f*. In this way, the inside of the fuel cell compartment 30 is ventilated. As a result, it is possible to prevent combustible gas (for example, the fuel gas leaking from the fuel cell 31) from being retained in the fuel cell compartment 30.

The cell compartment external gas detector 37 detects combustible gas (for example, hydrogen gas floating around the hull 1) flowing into the fuel cell compartment 30 from the outside. The cell compartment external gas detector 37 is, for example, a combustible gas sensor such as a hydrogen gas sensor. The cell compartment external gas detector 37 is arranged on a side opposite to the cell compartment air supply pipe 35 with respect to the cell compartment air supply device 36, that is, on the upstream side of the air flow from the outside to the inside of the fuel cell compartment 30. The cell compartment external gas detector 37 may include a gas sensor that detects a combustible gas other than hydrogen gas. Examples of combustible gases other than hydrogen gas include methane, ethane, propane, and carbon monoxide.

The cell compartment external gas detector 37 outputs, for example, a detection signal indicating the concentration of combustible gas to the control unit 12*a*. As a result, the control unit 12*a* can determine, based on the detection signal, whether the concentration of the combustible gas is equal to or higher than a standard value. Then, if the concentration is equal to or higher than the standard value, the control unit 12*a* can close the fuel cell side shutoff valve 33 to stop the supply of fuel gas from the fuel tank 41 to the fuel cell 31. The above-mentioned standard value may be determined based on experiments and/or experience.

The fuel cell ship SH further includes a cooling medium tank 38 and a cooling medium pipe 39. The cooling medium tank 38 stores a cooling medium for cooling the fuel cell 31. The cooling medium is, for example, an antifreeze liquid having low electrical conductivity. The antifreeze liquid is, for example, a liquid obtained by mixing pure water and ethylene glycol in a predetermined ratio. The cooling medium tank 38 is sealed, but an upper portion may be open.

The cooling medium pipe 39 is a pipe for circulating the cooling medium between the fuel cell 31 and a heat exchanger (not illustrated). A circulation pump (not illustrated) is also provided at a location along the cooling medium pipe 39. The fuel cell 31 is cooled by driving the circulation pump to supply the cooling medium from the heat exchanger to the fuel cell 31 via the cooling medium pipe 39. The cooling medium supplied for cooling the fuel cell 31 is also supplied, via the cooling medium pipe 39, to the cooling medium tank 38, at which a volume change due to a temperature change of the cooling medium liquid is absorbed and the amount of the cooling medium liquid is monitored.

A cooling tank internal gas detector 38*a* is provided in an upper portion inside the cooling medium tank 38. The cooling tank internal gas detector 38*a* is a fuel gas detector that detects the fuel gas existing in the cooling medium tank 38. As the fuel gas existing in the cooling medium tank 38, for example, a fuel gas which is leaked in the fuel cell 31 and then enters into the cooling medium tank 38 via the cooling medium pipe 39 can be considered. The fuel gas detection result (for example, fuel gas concentration information) by the cooling tank internal gas detector 38*a* is sent to the control unit 12*a*. As a result, the control unit 12*a* determines, based on the detection result of the cooling tank internal gas detector 38*a*, whether there is a fuel gas leak in the fuel cell 31, and if there is a leak, the control unit 12*a* can, for example, perform control to stop electric power generation by the fuel cell 31.

(2-2. Configuration of Fuel Gas Storage Unit)

The fuel gas storage unit 4 of the fuel cell ship SH includes the fuel tank 41, a gas filling pipe 42, and a tank side shutoff valve 43. The tank side shutoff valve 43 is an example of the peripheral equipment 11.

The fuel tank 41 stores the fuel (for example, the fuel gas) to be supplied to the fuel cell 31. In FIG. 3, for convenience, only one fuel tank 41 is illustrated, but the number of fuel tanks 41 is not particularly limited and there may be a plurality of the fuel tanks 41.

The gas filling pipe 42 is a pipe (fuel filling pipe) for replenishing the fuel tank 41 with fuel (for example, the fuel gas), or filling the fuel tank 41 with an inert gas. One end side of the gas filling pipe 42 is connected to the fuel tank 41. The other end side of the gas filling pipe 42 is branched into two, and these ends are connected to a fuel gas filling port 82 and an inert gas filling port 84, respectively. The fuel gas filling port 82 and the inert gas filling port 84 are provided in the duct compartment 90 (particularly, an upper duct compartment 80) described later.

The above-mentioned inert gas is, for example, nitrogen gas. For example, if the fuel gas remains in the fuel tank 41 when performing maintenance such as inspection or repair of the fuel cell ship SH in the dock (dry dock), there is a danger that an explosion may occur when the fuel gas ignites for some reason. Therefore, at the time of maintenance of the fuel cell ship SH, the fuel tank 41 is filled with the inert gas, and the fuel gas is removed from the fuel tank 41. As a result, it possible to avoid the danger of explosion.

In the fuel gas supply pipe 32 described above, a side opposite to the connection side with the fuel cell 31 is connected to the fuel tank 41, and a main valve 41*a* is provided between the fuel cell 31 and the fuel tank 41. That is, the fuel tank 41 and the fuel cell 31 are connected via the fuel gas supply pipe 32. The opening and closing of the main valve 41*a* of the fuel tank 41 is controlled by the control unit 12*a*.

The tank side shutoff valve 43 is an example of a shutoff valve SV that opens or closes the flow path of the fuel gas supply pipe 32. The opening and closing of the tank side shutoff valve 43 is controlled by the control unit 12*a*. More specifically, the tank side shutoff valve 43 switches between supplying the fuel gas from the fuel tank 41 to the fuel cell 31 and stopping the supply of fuel gas based on the control of the control unit 12*a*. Although only one tank side shutoff valve 43 is provided in the fuel gas supply pipe 32 in a tank compartment 40 described later, two or more tank side shutoff valves 43 may be provided.

The fuel cell ship SH further includes the tank compartment 40. The tank compartment 40 is a housing body that houses the fuel tank 41. The tank compartment 40 is arranged in the fuel room 14.

The tank compartment 40 has a hollow shape. For example, the tank compartment 40 has a hollow and substantially rectangular parallelepiped shape. In this case, the outer walls of the tank compartment 40 include, for example, a top wall 40a, a bottom wall 40b, a front wall (not illustrated), a back wall (not illustrated), a side wall 40c, and a side wall 40d. However, the top surface, bottom surface, front surface, back surface, and side surfaces of the tank compartment 40 can be arbitrarily determined. The shape of the tank compartment 40 is not particularly limited as long as the tank compartment 40 has a space that can house at least one fuel tank 41. The tank compartment 40 can also be considered as a container, chamber, or box for housing the fuel tank 41. The material of the outer wall of the tank compartment 40 is, for example, FRP, but may be an iron plate.

A tank compartment air supply port 40e with an opening is provided on the side wall 40c of the tank compartment 40. The tank compartment air supply port 40e is connected to a tank compartment air supply pipe 45 described later. The tank compartment air supply port 40e may be provided on an outer wall other than the side wall 40c in the tank compartment 40.

On the other hand, a tank compartment exhaust port 40f with an opening is provided on the top wall 40a of the tank compartment 40. The tank compartment exhaust port 40f communicates with a vent pipe 10. The vent pipe 10 is a pipe for guiding air inside the tank compartment 40 to the outside of the ship. The tank compartment exhaust port 40f may be provided on an outer wall other than the top wall 40a in the tank compartment 40.

The tank compartment 40 has an interior that is a closed space except for the tank compartment air supply port 40e and the tank compartment exhaust port 40f.

As illustrated in FIG. 1, two vent pipes 10 are provided on the left and right sides, respectively. The vent pipes 10 are located on the stern side with respect to the center of the hull 1 in the front-rear direction. The reason why the two vent pipes 10 are provided is that the fuel cell ship SH of the present embodiment includes two fuel cell compartments 30 on the right and left sides and two tank compartments 40 on the right and left sides, and two duct compartments 90 on the right and left sides, which will be described later. That is, the vent pipe 10 located on the left side of the hull 1 is provided corresponding to the fuel cell compartment 30, the tank compartment 40, and the duct compartment 90 located on the left side of the hull 1. The vent pipe 10 located on the right side of the hull 1 is provided corresponding to the fuel cell compartment 30, the tank compartment 40, and the duct compartment 90 located on the right side of the hull 1.

A part of the fuel gas supply pipe 32 described above and the tank side shutoff valve 43 are housed in the tank compartment 40. The tank compartment 40 further houses a tank compartment internal gas detector 44a and a tank compartment internal fire detector 44b.

The tank compartment internal gas detector 44a is a fuel gas detector arranged inside the tank compartment 40. For example, if the fuel gas is hydrogen gas, the tank compartment internal gas detector 44a includes a hydrogen gas detection sensor.

The tank compartment internal gas detector 44a is arranged on the top wall 40a located at the upper part of the tank compartment 40 to be close to the tank compartment exhaust port 40f or inside the tank compartment exhaust port 40f. In the unlikely event that the fuel gas leaks from the fuel tank 41 in the tank compartment 40, the leaked fuel gas goes toward the vent pipe 10 through the tank compartment exhaust port 40f. That is, the tank compartment exhaust port 40f is located on the most downstream side of the flow path through which the fuel gas flows when the fuel gas leaks inside the tank compartment 40. Therefore, by arranging the tank compartment internal gas detector 44a at a position near the tank compartment exhaust port 40f or inside the tank compartment exhaust port 40f, a fuel gas leaked in the tank compartment 40 can be reliably detected by the tank compartment internal gas detector 44a located on the most downstream side of the flow path, regardless of where the fuel gas leaks.

If the tank compartment internal gas detector 44a detects the fuel gas inside the tank compartment 40, a detection signal is sent from the tank compartment internal gas detector 44a to the control unit 12a. As a result, the control unit 12a can control the tank side shutoff valve 43 provided in the fuel gas supply pipe 32 to stop the supply of fuel gas from the fuel tank 41 to the fuel cell 31. The details of control for opening and closing of the tank side shutoff valve 43 will be described later.

The tank compartment internal fire detector 44b is a fire detector arranged inside the tank compartment 40. The tank compartment internal fire detector 44b includes, for example, one or more sensors among a smoke sensor for detecting smoke, a heat sensor for detecting heat, and a flame sensor for detecting flame. The tank compartment internal fire detector 44b may include a thermocouple type fire detector.

The tank compartment internal fire detector 44b is arranged on an inner surface of the top wall 40a located at an upper part of the tank compartment 40. In the unlikely event that a fire occurs inside the tank compartment 40, the tank compartment internal fire detector 44b detects the fire and outputs a detection signal indicating that a fire has occurred to the control unit 12a. In this case, the control unit 12a can control the tank side shutoff valve 43 to stop the supply of fuel gas from the fuel tank 41 to the fuel cell 31. As a result, in the tank compartment 40, the risk of explosion due to ignition of the fuel gas can be reduced as much as possible.

The tank compartment air supply pipe 45 is connected to the tank compartment 40. The tank compartment air supply pipe 45 extends from the tank compartment air supply port 40e of the tank compartment 40 to the deck 1a, and is exposed from an upper surface of the deck 1a.

A tank compartment air supply device 46 and a tank compartment external gas detector 47 are arranged at an end portion on the deck 1a side of the tank compartment air supply pipe 45. The tank compartment air supply device 46 and the tank compartment external gas detector 47 are located above the deck 1a.

The tank compartment air supply device 46 includes, for example, an inexpensive non-explosion-proof air supply fan, but may include an explosion-proof air supply fan. The drive of the tank compartment air supply device 46 is controlled by the control unit 12a. One or more filters (not illustrated) may be arranged in the tank compartment air supply device 46. The filter removes, for example, dust or sea salt particles.

The tank compartment air supply device 46 supplies air outside the tank compartment 40 to the inside of the tank compartment 40 via the tank compartment air supply pipe 45 and the tank compartment air supply port 40e. The air inside the tank compartment 40 is discharged to the vent pipe 10 via the tank compartment exhaust port 40f. In this way, the inside of the tank compartment 40 is ventilated. As a result, even if the fuel gas leaks from the fuel tank 41 in the tank compartment 40, the retention of the fuel gas can be suppressed.

The tank compartment external gas detector 47 detects combustible gas (for example, hydrogen gas floating around the hull 1) flowing into the tank compartment 40 from the outside. The tank compartment external gas detector 47 is, for example, a combustible gas sensor such as a hydrogen gas sensor. The tank compartment external gas detector 47 is arranged on a side opposite to the tank compartment air supply pipe 45 with respect to the tank compartment air supply device 46, that is, on the upstream side of the air flow from the outside to the inside of the tank compartment 40. The tank compartment external gas detector 47 may include a gas sensor that detects a combustible gas other than hydrogen gas.

The tank compartment external gas detector 47 outputs, for example, a detection signal indicating the concentration of combustible gas to the control unit 12a. As a result, the control unit 12a can determine, based on the detection signal, whether the concentration of the combustible gas is equal to or higher than a standard value. Then, if the concentration is equal to or higher than the standard value, the control unit 12a can close the tank side shutoff valve 43 to stop the supply of fuel gas from the fuel tank 41 to the fuel cell 31. The above-mentioned standard value may be determined based on experiments and/or experience.

(2-3. Duct Compartment)

The fuel cell ship SH further includes a lower duct compartment 70 and the upper duct compartment 80. Here, the lower duct compartment 70 and the upper duct compartment 80 are collectively referred to as a duct compartment 90. The duct compartment 90 is a housing body that houses various pipes. For example, the duct compartment 90 houses a part of the fuel gas supply pipe 32. The inside of the lower duct compartment 70 and the inside of the upper duct compartment 80 communicate with each other via a duct communication portion 91. In the following, details of the lower duct compartment 70 and the upper duct compartment 80 will be described.

<2-3-1. Lower Duct Compartment>

The lower duct compartment 70 is located below the deck 1a. More specifically, the lower duct compartment 70 is arranged in the engine room 13. In the engine room 13, the lower duct compartment 70 is located on the stern side with respect to the fuel cell compartment 30. That is, below the deck 1a, the lower duct compartment 70 is located between the fuel cell compartment 30 and the tank compartment 40. The lower duct compartment 70 houses a part of the fuel gas supply pipe 32 and a part of the gas filling pipe 42.

Here, the "part of the fuel gas supply pipe 32" housed in the lower duct compartment 70 refers to a portion of the fuel gas supply pipe 32 located between the fuel cell compartment 30 and the tank compartment 40. The "part of the gas filling pipe 42" housed in the lower duct compartment 70 refers to a portion of the gas filling pipe 42 located between the tank compartment 40 and the upper duct compartment 80.

The material of the lower duct compartment 70 is, for example, FRP, but may be an iron plate. The lower duct compartment 70 has a hollow shape. For example, the lower duct compartment 70 has a hollow and substantially rectangular parallelepiped shape. In this case, the outer walls of the lower duct compartment 70 include, for example, a top wall 70a, a bottom wall 70b, a front wall (not illustrated), a back wall (not illustrated), a side wall 70c, and a side wall 70d. However, the top surface, bottom surface, front surface, back surface, and side surfaces of the lower duct compartment 70 can be arbitrarily determined. The shape of the lower duct compartment 70 is not particularly limited as long as the lower duct compartment 70 has a space that can house a part of the fuel gas supply pipe 32 and the like. The lower duct compartment 70 can also be regarded as a container, a chamber, or a box for housing a part of the fuel gas supply pipe 32 and the like.

A lower duct compartment air supply port 70e with an opening is provided in the side wall 70d of the lower duct compartment 70. The lower duct compartment air supply port 70e is connected to a lower duct compartment air supply pipe 74 described later. The lower duct compartment air supply port 70e may be provided on an outer wall other than the side wall 70d in the lower duct compartment 70.

On the other hand, a lower duct compartment communication port 70f with an opening is provided in the top wall 70a of the lower duct compartment 70. The lower duct compartment communication port 70f communicates with the duct communication portion 91 described above. The lower duct compartment communication port 70f may be provided on an outer wall other than the top wall 70a in the lower duct compartment 70.

A cell compartment communication port 70g with an opening is provided in the side wall 70d of the lower duct compartment 70. The cell compartment communication port 70g is connected to the cell compartment exhaust port 30f of the fuel cell compartment 30 described above via a communication pipe 92. As a result, the air inside the fuel cell compartment 30 flows into the lower duct compartment 70 via the cell compartment exhaust port 30f, the communication pipe 92, and the cell compartment communication port 70g. The cell compartment communication port 70g may be provided on an outer wall other than the side wall 70d in the lower duct compartment 70.

The communication pipe 92 includes, for example, a double pipe having an inner pipe and an outer pipe. Examples of the inner pipe include the fuel gas supply pipe 32. The outer pipe is located on the outside of the inner pipe in the radial direction. The gas inside the fuel cell compartment 30 travels between the inner pipe and the outer pipe of the communication pipe 92, from the cell compartment exhaust port 30f to the cell compartment communication port 70g of the lower duct compartment 70.

The lower duct compartment 70 has a closed space inside except for the lower duct compartment air supply port 70e, the lower duct compartment communication port 70f, and the cell compartment communication port 70g.

The lower duct compartment 70 houses a part of a fuel gas discharge pipe 71. The fuel gas discharge pipe 71 is a fuel discharge pipe provided by branching from the fuel gas supply pipe 32 located in the lower duct compartment 70. For example, the fuel gas discharge pipe 71 is provided by branching from the fuel gas supply pipe 32 between the two shutoff valves SV.

More specifically, the fuel gas discharge pipe 71 is provided by branching from the fuel gas supply pipe 32 between the tank side shutoff valve 43 in the tank compartment 40 and the fuel cell side shutoff valve 33 in the fuel cell compartment 30. The fuel gas discharge pipe 71 extends from the inside of the lower duct compartment 70 to the inside of the upper duct compartment 80 via the lower duct compartment communication port 70f and the duct communication portion 91, and further communicates with the inside of the vent pipe 10. Therefore, the "part of the fuel gas discharge pipe 71" housed in the lower duct compartment 70 refers to a portion of the fuel gas discharge pipe 71 located between the point of the branching from the fuel gas supply pipe 32 and the upper duct compartment 80.

The lower duct compartment 70 further houses a release valve 72. The release valve 72 is an on-off valve installed in the fuel gas discharge pipe 71 to open or close the flow path of the fuel gas discharge pipe 71. The release valve 72 is an example of peripheral equipment 11. The opening and closing of the release valve 72 are controlled by the control unit 12a. The release valve 72 may be installed in the upper duct compartment 80.

The lower duct compartment 70 further houses a lower duct compartment internal gas detector 73. The lower duct compartment internal gas detector 73 is a fuel gas detector arranged inside the lower duct compartment 70. For example, if the fuel gas is hydrogen gas, the lower duct compartment internal gas detector 73 includes a hydrogen gas detection sensor.

The lower duct compartment internal gas detector 73 is arranged on the top wall 70a located at an upper portion of the lower duct compartment 70 to be close to the lower duct compartment communication port 70f or inside the lower duct compartment communication port 70f. In the unlikely event that the fuel gas leaks from the fuel gas supply pipe 32 in the lower duct compartment 70, the leaked fuel gas goes toward the upper duct compartment 80 through the lower duct compartment communication port 70f. That is, the lower duct compartment communication port 70f is located on the most downstream side of the flow path through which the fuel gas flows when the fuel gas leaks in the lower duct compartment 70. Therefore, by arranging the lower duct compartment internal gas detector 73 at a position close to the lower duct compartment communication port 70f or inside the lower duct compartment communication port 70f, a fuel gas leaked in the lower duct compartment 70 can be reliably detected by the lower duct compartment internal gas detector 73 located on the most downstream side of the flow path, regardless of where the fuel gas leaks.

If the lower duct compartment internal gas detector 73 detects the fuel gas in the lower duct compartment 70, a detection signal is sent from the lower duct compartment internal gas detector 73 to the control unit 12a. As a result, the control unit 12a can perform control described later to stop the electric power generation of the fuel cell 31 based on the detection signal.

The lower duct compartment 70 may further house a fire detector that detects a fire inside the lower duct compartment 70.

The lower duct compartment air supply pipe 74 is connected to the lower duct compartment 70. The lower duct compartment air supply pipe 74 extends from the lower duct compartment air supply port 70e of the lower duct compartment 70 to the deck 1a and is exposed from the upper surface of the deck 1a.

A lower duct compartment air supply device 75 and a lower duct compartment external gas detector 76 are arranged at an end portion on the deck 1a side of the lower duct compartment air supply pipe 74. The lower duct compartment air supply device 75 and the lower duct compartment external gas detector 76 are located above the deck 1a.

The lower duct compartment air supply device 75 includes, for example, an inexpensive non-explosion-proof air supply fan, but may include an explosion-proof air supply fan. The drive of the lower duct compartment air supply device 75 is controlled by the control unit 12a. One or more filters (not illustrated) may be arranged in the lower duct compartment air supply device 75. The filter removes, for example, dust or sea salt particles.

The lower duct compartment air supply device 75 supplies the air outside the lower duct compartment 70 (duct compartment 90) to the inside of the lower duct compartment 70 via the lower duct compartment air supply pipe 74 and the lower duct compartment air supply port 70e. The air inside the lower duct compartment 70 is discharged to the upper duct compartment 80 through the lower duct compartment communication port 70f. In this way, the inside of the lower duct compartment 70 is ventilated. As a result, even if the fuel gas leaks from the fuel gas supply pipe 32 in the lower duct compartment 70, retention of the fuel gas can be suppressed.

The lower duct compartment external gas detector 76 detects combustible gas (for example, hydrogen gas floating around the hull 1) flowing into the duct compartment 90 from the outside. The lower duct compartment external gas detector 76 is, for example, a combustible gas sensor such as a hydrogen gas sensor. The lower duct compartment external gas detector 76 is arranged on a side opposite to the lower duct compartment air supply pipe 74 with respect to the lower duct compartment air supply device 75, that is, on the upstream side of the air flow from the outside to the inside of the duct compartment 90. The lower duct compartment external gas detector 76 may include a gas sensor that detects a combustible gas other than hydrogen gas.

The lower duct compartment external gas detector 76 outputs, for example, a detection signal indicating the concentration of combustible gas to the control unit 12a. As a result, the control unit 12a can determine, based on the detection signal, whether the concentration of the combustible gas is equal to or higher than a standard value. Then, if the concentration is equal to or higher than the standard value, the control unit 12a can control the shutoff valves SV to stop the supply of fuel gas from the fuel tank 41 to the fuel cell 31. The above-mentioned standard value may be determined based on experiments and/or experience.

<2-3-2. Upper Duct Compartment>

The upper duct compartment 80 is located on the deck 1a. More specifically, the upper duct compartment 80 is arranged on the deck 1a to cover an area partially including the lower duct compartment 70 and the tank compartment 40. The upper duct compartment 80 houses a part of the fuel gas discharge pipe 71 and a part of the gas filling pipe 42.

Here, the "part of the fuel gas discharge pipe 71" housed in the upper duct compartment 80 refers to a portion of the fuel gas discharge pipe 71 that extends from the lower duct compartment 70 toward the vent pipe 10. The "part of the gas filling pipe 42" housed in the upper duct compartment 80 refers to a portion of the gas filling pipe 42 that extends from the lower duct compartment 70 to the fuel gas filling port 82 described later.

The material of the upper duct compartment 80 is, for example, FRP, but may be an iron plate. The upper duct compartment 80 has a hollow shape. For example, the upper duct compartment 80 has a hollow and substantially rectangular parallelepiped shape. In this case, the outer walls of the upper duct compartment 80 include, for example, a top wall 80a, a bottom wall 80b, a front wall (not illustrated), a back wall (not illustrated), a side wall 80c, and a side wall 80d. However, the top surface, bottom surface, front surface, back surface, and side surfaces of the upper duct compartment 80 can be arbitrarily determined. The shape of the upper duct compartment 80 is not particularly limited as long as the upper duct compartment 80 has a space that can house a part of the fuel gas discharge pipe 71 and the like. The upper duct compartment 80 can also be regarded as a container, a chamber, or a box for housing the part of the fuel gas discharge pipe 71 and the like.

The fuel gas discharge pipe 71, as described above, communicates with the inside of the vent pipe 10. Thus, when the release valve 72 is opened, the gas inside the fuel gas discharge pipe 71 (for example, the fuel gas) flows from an end portion 71a of the fuel gas discharge pipe 71 into the vent pipe 10 and is released from the vent pipe 10 to the outside of the ship. Here, it is desirable that, in the vent pipe 10, the end portion 71a of the fuel gas discharge pipe 71 faces upward, that is, faces the open port side of the vent pipe 10. In this case, the discharge direction of gas discharged from the end portion 71a of the fuel gas discharge pipe 71 is upward.

For example, if the fuel gas is discharged sideways from the end portion 71a of the fuel gas discharge pipe 71, the discharged fuel gas reaches the inner wall surface of the vent pipe 10 and then flows downward. This may result in unwanted detection by the tank compartment internal gas detector 44a in the tank compartment 40. By the end portion 71a of the fuel gas discharge pipe 71 facing upward inside the vent pipe 10 as described above, it is possible to reduce unwanted detection by the tank compartment internal gas detector 44a due to the fuel gas discharged from the end portion 71a.

An upper duct compartment air supply port 80e with an opening is provided in the bottom wall 80b of the upper duct compartment 80. The upper duct compartment air supply port 80e communicates with the duct communication portion 91. Therefore, the upper duct compartment 80 communicates with the lower duct compartment 70 via the upper duct compartment air supply port 80e, the duct communication portion 91, and the lower duct compartment communication port 70f. The upper duct compartment air supply port 80e may be provided on an outer wall other than the bottom wall 80b in the upper duct compartment 80.

The upper duct compartment 80 has a vent pipe communication portion 81. The vent pipe communication portion 81 is a pipe by which the inside of the upper duct compartment 80 communicates with the vent pipe 10. In FIG. 3, the vent pipe communication portion 81 is illustrated as having a shape bent upward from the horizontal orientation, but the shape of the vent pipe communication portion 81 is not limited to the shape in FIG. 3. The reason why the vent pipe communication portion 81 is bent upward is similar to the reason why the end portion 71a of the fuel gas discharge pipe 71 is bent upward. That is, the vent pipe communication portion 81 is bent upward to reduce unwanted detection by the tank compartment internal gas detector 44a due to the fuel gas discharged from the vent pipe communication portion 81, which will be described later.

The vent pipe 10 extends upward from the tank compartment 40 and passes through the interior of the upper duct compartment 80. More specifically, the vent pipe 10 passes through the bottom wall 80b of the upper duct compartment 80, enters the inside of the vent pipe 10, and passes through the top wall 80a. Although the top wall 80a is actually inclined as illustrated in FIG. 1, the top wall 80a is illustrated as being horizontal in FIG. 3, for convenience. The vent pipe communication portion 81 is provided in the upper duct compartment 80 to penetrate through the side wall of the vent pipe 10. As a result, the upper duct compartment 80 communicates with the vent pipe 10 via the vent pipe communication portion 81.

Therefore, the air inside the upper duct compartment 80 is discharged to the outside of the ship through the vent pipe communication portion 81 and the vent pipe 10. In this way, it is possible to ventilate the inside of the upper duct compartment 80. If the fuel gas leaks from the fuel gas discharge pipe 71 in the upper duct compartment 80, the leaked fuel gas is discharged to the outside of the ship through the vent pipe communication portion 81 and the vent pipe 10. In this way, it is possible to prevent the leaked fuel gas from being retained in the upper duct compartment 80.

The upper duct compartment 80 and the lower duct compartment 70 communicate with each other via the duct communication portion 91. As a result, (1) air taken into the inside of the lower duct compartment 70 via the lower duct compartment air supply pipe 74, (2) a fuel gas leaked from the fuel gas supply pipe 32 in the lower duct compartment 70 for some reason, and (3) air or a fuel gas discharged from the fuel cell compartment 30 to the lower duct compartment 70 via the communication pipe 92 can be discharged to the outside of the ship via the upper duct compartment 80 and the vent pipe 10. In this way, it is possible to suppress the retention of the fuel gas inside the lower duct compartment 70 and inside the fuel cell compartment 30.

The fuel gas filling port 82 and a fuel gas check valve 83 are provided in the upper duct compartment 80. The fuel gas filling port 82 is a fuel filling port that serves as an inlet for filling the fuel tank 41 with fuel (for example, the fuel gas), and is connected to the gas filling pipe 42.

The fuel gas check valve 83 is provided in the gas filling pipe 42. More specifically, the fuel gas check valve 83 is located between the point where an inert gas pipe 87 (described later) branches from the gas filling pipe 42 and the fuel gas filling port 82.

The fuel gas supplied from the fuel gas filling port 82 travels through the fuel gas check valve 83 and the gas filling pipe 42, and is supplied to the fuel tank 41 in the tank compartment 40. As a result, the fuel gas is filled in the fuel tank 41 and stored. The fuel gas check valve 83 is provided to prevent backflow of the fuel gas from the fuel tank 41 side to the fuel gas filling port 82.

The upper duct compartment 80 is further provided with the inert gas filling port 84, an on-off valve 85, an inert gas check valve 86, and the inert gas pipe 87. The inert gas filling port 84 is an inlet for filling the fuel tank 41 with an inert gas, and is connected to the inert gas pipe 87. The inert gas pipe 87 is provided by branching from the gas filling pipe 42 in the upper duct compartment 80. The on-off valve 85 and the inert gas check valve 86 are provided in the inert gas pipe 87. In the inert gas pipe 87, the on-off valve 85 is located between the inert gas filling port 84 and the inert gas check valve 86.

The on-off valve 85 opens or closes the flow path of the inert gas pipe 87. In a configuration in which the inert gas check valve 86 is provided in the inert gas pipe 87, installation of the on-off valve 85 may be omitted.

When inert gas is supplied to the inert gas filling port 84 and the on-off valve 85 opens the flow path of the inert gas pipe 87 in a state in which the fuel gas is not supplied to the fuel gas filling port 82, the inert gas is supplied to the fuel tank 41 in the tank compartment 40 through the inert gas check valve 86, and via the inert gas pipe 87 and the gas filling pipe 42. In addition, the tank side shutoff valve 43 opens the flow path of the fuel gas supply pipe 32, the fuel cell side shutoff valve 33 closes the flow path of the fuel gas supply pipe 32, and the release valve 72 opens the flow path of the fuel gas discharge pipe 71, whereby the fuel gas remaining in the fuel tank 41 is discharged to the vent pipe 10 via the fuel gas supply pipe 32 and the fuel gas discharge pipe 71. As a result, the fuel gas can be removed from the fuel tank 41 (purge process). In this process, the main valve 41 is opened or closed at the right time.

There may be a pipe from the gas filling pipe 42 that is directly connected to the fuel gas supply pipe 32 between the fuel tank 41 and the tank side shutoff valve 43 (tank method). In this configuration, when performing a purge process for the fuel tank 41 using the inert gas, it is necessary to fill the fuel tank 41 with the inert gas in a state in which the tank side shutoff valve 43 is closed, and after that, to open the tank side shutoff valve 43 for the purpose of facilitating the release of the inert gas from the fuel tank 41.

The fuel gas filling port 82 and the inert gas filling port 84 are provided in the upper duct compartment 80 as described above. Here, when the fuel gas filling port 82 and a fuel gas filling port lid portion 82a (described later) is considered as one and the inert gas filling port 84 and an inert gas filling port lid portion 84a (described later) is considered as one, it can be said that the fuel gas filling port 82 and the inert gas filling port 84 are located at a boundary surface between the inside and the outside of the upper duct compartment 80. Therefore, "the fuel gas filling port 82 and the inert gas filling port 84 are provided in the upper duct compartment 80" includes a case where the fuel gas filling port 82 and the inert gas filling port 84 are provided at the boundary surface of the upper duct compartment 80.

An upper duct compartment internal gas detector 88 is housed in the upper duct compartment 80. The upper duct compartment internal gas detector 88 is a fuel gas detector arranged inside the upper duct compartment 80. For example, if the fuel gas is hydrogen gas, the upper duct compartment internal gas detector 88 includes a hydrogen gas detection sensor.

The upper duct compartment internal gas detector 88 is arranged on the top wall 80a located in an upper portion of the upper duct compartment 80. Hydrogen gas as the fuel gas is lighter than air and rises. Therefore, if the fuel gas leaks in the upper duct compartment 80, the leaked fuel gas can be reliably detected by the upper duct compartment internal gas detector 88. To more reliably detect the fuel gas leaked in the upper duct compartment 80, the upper duct compartment internal gas detector 88 may be arranged at a position close to the vent pipe communication portion 81.

If the upper duct compartment internal gas detector 88 detects the fuel gas in the upper duct compartment 80, a detection signal is sent from the upper duct compartment internal gas detector 88 to the control unit 12a. As a result, the control unit 12a can perform control described later to stop the electric power generation of the fuel cell 31 based on the detection signal.

The upper duct compartment 80 may further house a fire detector that detects a fire inside the upper duct compartment 80.

(2-4. Supplementary Information about Vent Pipe)

Inside the vent pipe 10, a vent pipe internal gas detector 10a is provided further on the downstream side than a discharge port 81a of the vent pipe communication portion 81. The downstream side refers to the downstream side in the air flow direction when the air inside the tank compartment 40 flows inside the vent pipe 10 and is discharged to the outside of the ship. For example, if the fuel gas is hydrogen gas, the vent pipe internal gas detector 10a includes a diffusion type or suction type hydrogen gas detection sensor. A detection signal from the vent pipe internal gas detector 10a is sent to the control unit 12a.

For example, in a state where the control unit 12a outputs a signal (closing signal) for closing the release valve 72, if the vent pipe internal gas detector 10a detects the fuel gas even though the tank compartment internal gas detector 44a and the upper duct compartment internal gas detector 88 do not detect the fuel gas, it is possible to determine that the release valve 72 is not completely blocking the flow path of the fuel gas discharge pipe 71, that is, the release valve 72 is malfunctioning. In this case, by sending a notification to the outside, for example, the control unit 12a can prompt a maintenance person to inspect, repair, or replace the release valve 72. The notification to the outside includes a monitor display, output of an alarm sound, transmission of information to an external terminal, and the like.

[3. Concentration of Hazardous Sites in Duct Compartment]

Figure 4:
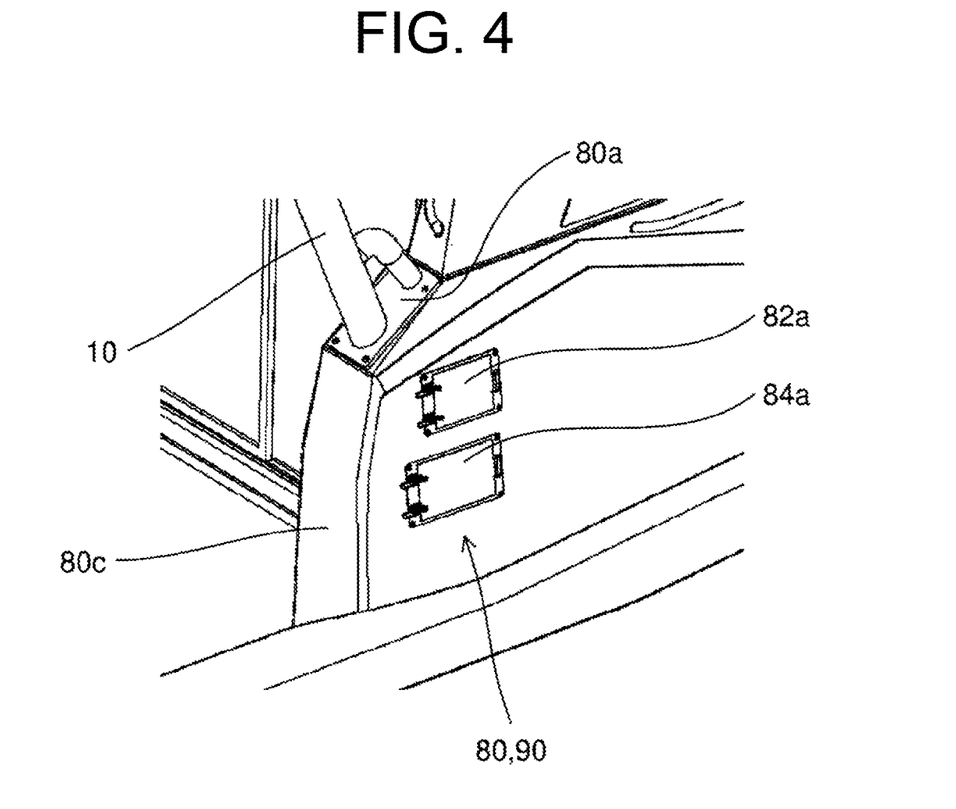
FIG. 4 is an enlarged perspective view illustrating a portion A in FIG. 1.
Figure 5:
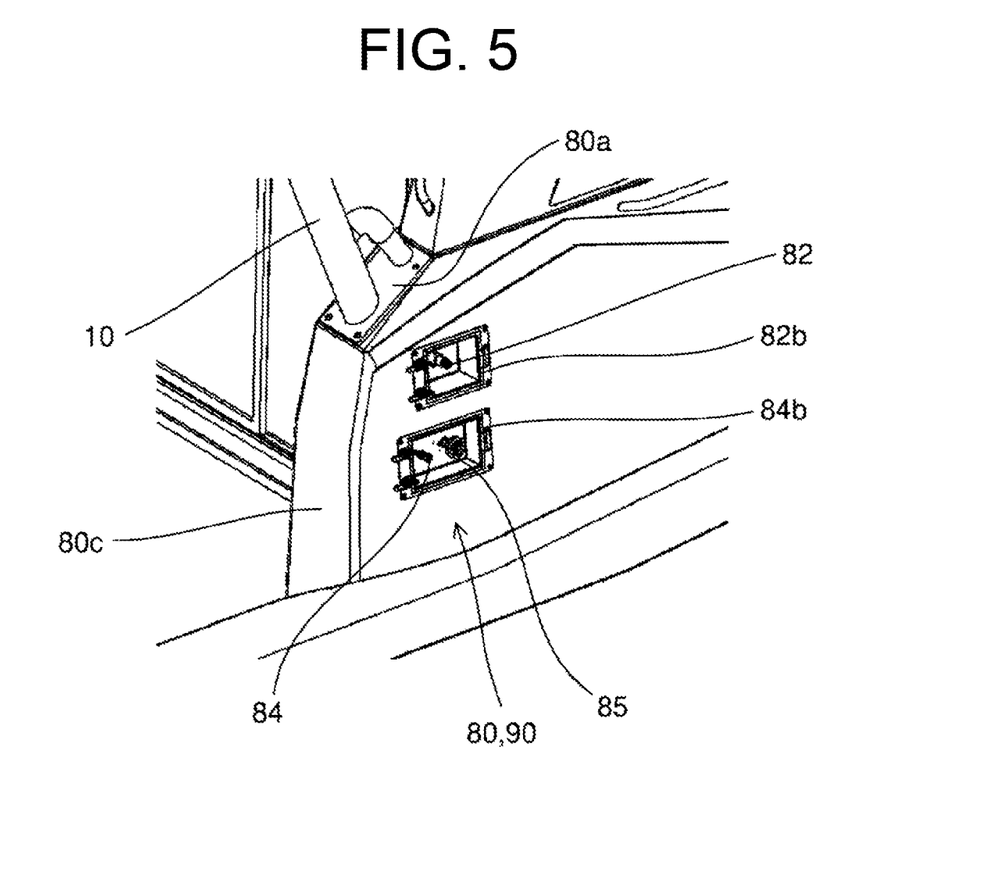
FIG. 5 is a perspective view of the portion A in FIG. 1 in which a fuel gas filling port lid portion and an inert gas filling port lid portion are not illustrated.

Next, concentration of hazardous sites through which the fuel gas passes in the duct compartment 90, in the above-described fuel cell ship SH, will be described with reference to FIGS. 1 to 3 as well as FIGS. 4 and 5. FIG. 4 is an enlarged perspective view illustrating a portion A in FIG. 1. FIG. 5 is a perspective view of the portion A in FIG. 1 in which the fuel gas filling port lid portion 82a and the inert gas filling port lid portion 84a are not illustrated.

The fuel gas filling port lid portion 82a is pivotably provided with respect to an upper window portion 82b illustrated in FIG. 5. The fuel gas filling port 82 provided in the upper duct compartment 80 is located inside the upper window portion 82b. By pivoting the fuel gas filling port lid portion 82a to open the upper window portion 82b, the fuel gas filling port 82 is exposed to the outside. As a result, it becomes possible to fill the fuel tank 41 with the fuel gas via the fuel gas filling port 82. On the other hand, by pivoting the fuel gas filling port lid portion 82a to close the upper window portion 82b, the fuel gas filling port 82 is hidden. The fuel cell ship SH navigates in such a state where the fuel gas filling port 82 is hidden by the fuel gas filling port lid portion 82a.

The inert gas filling port lid portion 84a is pivotably provided with respect to a lower window portion 84b illustrated in FIG. 5. The inert gas filling port 84 and the on-off valve 85 provided in the upper duct compartment 80 are located inside the lower window portion 84b. By pivoting the inert gas filling port lid portion 84a to open the lower window portion 84b, the inert gas filling port 84 and the on-off valve 85 are exposed to the outside. As a result, it becomes possible to open the on-off valve 85, and fill the fuel tank 41 with the inert gas via the inert gas filling port 84. On the other hand, by pivoting the fuel gas filling port lid portion 84a to close the lower window portion 84b, the inert gas filling port 84 and the on-off valve 85 are hidden. The fuel cell ship SH navigates in such a state where the inert gas filling port 84 and the on-off valve 85 are hidden by the inert gas filling port lid portion 84a.

As described above, the fuel cell ship SH includes the duct compartment 90 that houses a part of the fuel gas supply pipe 32 (fuel supply pipe), the vent pipe 10 that communicates (via the vent pipe communication portion 81) with the duct compartment 90 (particularly, the upper duct compartment 80), and the fuel gas filling port 82 (fuel filling port) that serves as an inlet for filling the fuel tank 41 with fuel. As illustrated in FIGS. 1, 3, and 5, the fuel gas filling port 82 is provided in the duct compartment 90 (particularly, the upper duct compartment 80).

In the unlikely event that the fuel gas leaks from the fuel gas supply pipe 32 in the duct compartment 90, the leaked fuel gas travels toward the vent pipe 10 (via the vent pipe communication portion 81) and passes through the vent pipe 10 to be discharged to the outside of the duct compartment 90 (for example, the outside of the ship). In filling the fuel tank 41 with the fuel gas, the fuel gas is supplied to the fuel tank 41 through the fuel gas filling port 82. Therefore, the vent pipe 10 and the fuel gas filling port 82 are hazardous sites through which the fuel gas passes. To ensure safety, it may be required not to arrange various electrical equipment (for example, the lower duct compartment air supply device 75 being a non-explosion-proof air supply fan) around the hazardous sites (for example, within a radius of 1.5 m). Therefore, if the vent pipe 10 and the fuel gas filling port 82 are provided apart from each other, the hazardous locations where various electrical equipment cannot be arranged will increase.

By providing the fuel gas filling port 82 in the duct compartment 90 that communicates with the vent pipe 10, the hazardous sites through which the fuel gas passes (the fuel gas filling port 82 and the vent pipe 10) are concentrated in the duct compartment 90. This makes it possible to narrow the hazardous location in which various electrical equipment cannot be arranged (the range of the hazardous location can be made compact), as compared with a configuration in which the fuel gas filling port 82 and the vent pipe 10 are provided apart from each other (for example, in separate compartments). As a result, the degree of freedom of arranging various electrical equipment can be increased.

The fuel cell ship SH includes the fuel gas discharge pipe 71 (fuel discharge pipe) provided by branching from the fuel gas supply pipe 32 (fuel supply pipe), and also includes the gas filling pipe 42 (fuel filling pipe) that connects the fuel gas filling port 82 (fuel filling port) and the fuel tank 41. The duct compartment 90 houses the fuel gas discharge pipe 71 and the gas filling pipe 42 (see FIG. 3).

As with the fuel gas filling port 82 and the vent pipe 10, the fuel gas discharge pipe 71 and the gas filling pipe 42 are also hazardous sites through which the fuel gas passes. The configuration in which the duct compartment 90 houses the fuel gas discharge pipe 71 and the gas filling pipe 42, which are hazardous sites, together, makes it possible to narrow the hazardous location as compared with a configuration in which these pipes are provided in different locations. Therefore, similar to the above, the degree of freedom of arranging various electrical equipment can be increased.

The fuel cell ship SH includes the inert gas filling port 84 that serves as an inlet for filling the fuel tank 41 with an inert gas, and also includes the inert gas pipe 87 connected to the inert gas filling port 84 and the gas filling pipe 42. The duct compartment 90 further houses the inert gas pipe 87 (see FIG. 3).

In this configuration, the pipes for supplying gas to the fuel tank 41 can be gathered in the duct compartment 90 to realize a compact arrangement. That is, the gas filling pipe 42 for supplying the fuel gas to the fuel tank 41 and the inert gas pipe 87 for supplying the inert gas to the fuel tank 41 can be gathered in the duct compartment 90 to realize a compact arrangement.

The fuel cell ship SH includes the fuel cell compartment 30 in which the fuel cell 31 is installed, and also includes the communication pipe 92 by which the fuel cell compartment 30 communicates with the duct compartment 90 (for example, the lower duct compartment 70) (see FIG. 3).

In this configuration, the exhaust gas from the fuel cell compartment 30 can be discharged to the duct compartment 90 via the communication pipe 92, and can be discharged from the duct compartment 90 to the outside (for example, the outside of the ship) via the vent pipe 10. Therefore, the total number of vent pipes can be reduced and the configuration can be simplified as compared with the configuration in which a dedicated vent pipe (independent of the other compartments) is separately provided in the fuel cell compartment 30. Even in the unlikely event that the fuel gas leaks in the fuel cell compartment 30, the leaked fuel gas is guided to the duct compartment 90 via the communication pipe 92. That is, the sites through which the leaked fuel gas passes are concentrated in the duct compartment 90. As a result, the hazardous location is narrowed as compared with, for example, a configuration in which a dedicated vent pipe is provided in the fuel cell compartment 30. This makes it possible to further increase the degree of freedom of arranging various electrical equipment.

The fuel cell ship SH includes the tank compartment 40 in which the fuel tank 41 is installed. The vent pipe 10 communicates with both the duct compartment 90 (particularly, the upper duct compartment 80) and the tank compartment 40 (see FIG. 3).

In this configuration, the exhaust gas from the tank compartment 40 can be discharged to the outside (for example, the outside of the ship) via the vent pipe 10. The vent pipe 10 for evacuation is shared by the tank compartment 40 and the duct compartment 90, because of which it is possible to reduce the total number of vent pipes as compared with a configuration in which vent pipes are separately provided in the tank compartment 40 and the duct compartment 90, and thus simplify the configuration. Even in the unlikely event that the fuel gas leaks from at least one of the tank compartment 40 and the duct compartment 90, the leaked fuel gas is concentrated in one vent pipe 10 and discharged to the outside. As a result, the hazardous location is narrowed as compared with, for example, a configuration in which separate vent pipes are provided in the tank compartment 40 and the duct compartment 90 to discharge the fuel gas from the separate vent pipes. This makes it possible to further increase the degree of freedom of arranging various electrical equipment.

In the present embodiment, the lower duct compartment air supply device 75 is arranged around the duct compartment 90. The lower duct compartment air supply device 75 is an example of electrical equipment EM (see FIG. 3) arranged around the duct compartment 90. That is, the fuel cell ship SH of the present embodiment includes the electrical equipment EM arranged around the duct compartment 90. In this case, the degree of freedom of arranging the electrical equipment EM around the duct compartment 90 can be increased.

In particular, the electrical equipment EM includes a duct compartment air supply device (lower duct compartment air supply device 75) that supplies air to the inside of the duct compartment 90 (lower duct compartment 70). In this case, the degree of freedom of arranging the lower duct compartment air supply device 75 around the duct compartment 90 can be increased.

[4. Measures to be Taken when Fuel Gas Leak Occurs in Duct Compartment]

As described above, the hazardous sites through which the fuel gas passes are concentrated in the duct compartment 90. Therefore, to take appropriate measures when a fuel gas leak occurs in the duct compartment 90, fuel gas detectors (the upper duct compartment internal gas detector 88 and the lower duct compartment internal gas detector 73) that detect the fuel gas being the fuel in a gaseous state are installed inside the duct compartment 90. The control unit 12a controls the electric power generation of the fuel cell 31 based on the detection signal output from the fuel gas detector. Only the upper duct compartment internal gas detector 88 may be installed in the duct compartment 90. That is, the lower duct compartment internal gas detector 73 may not be installed. This is because hydrogen that has leaked in the lower duct compartment 70 will eventually flow into the upper duct compartment 80 and be detected by the upper duct compartment internal gas detector 88.

Figure 6:
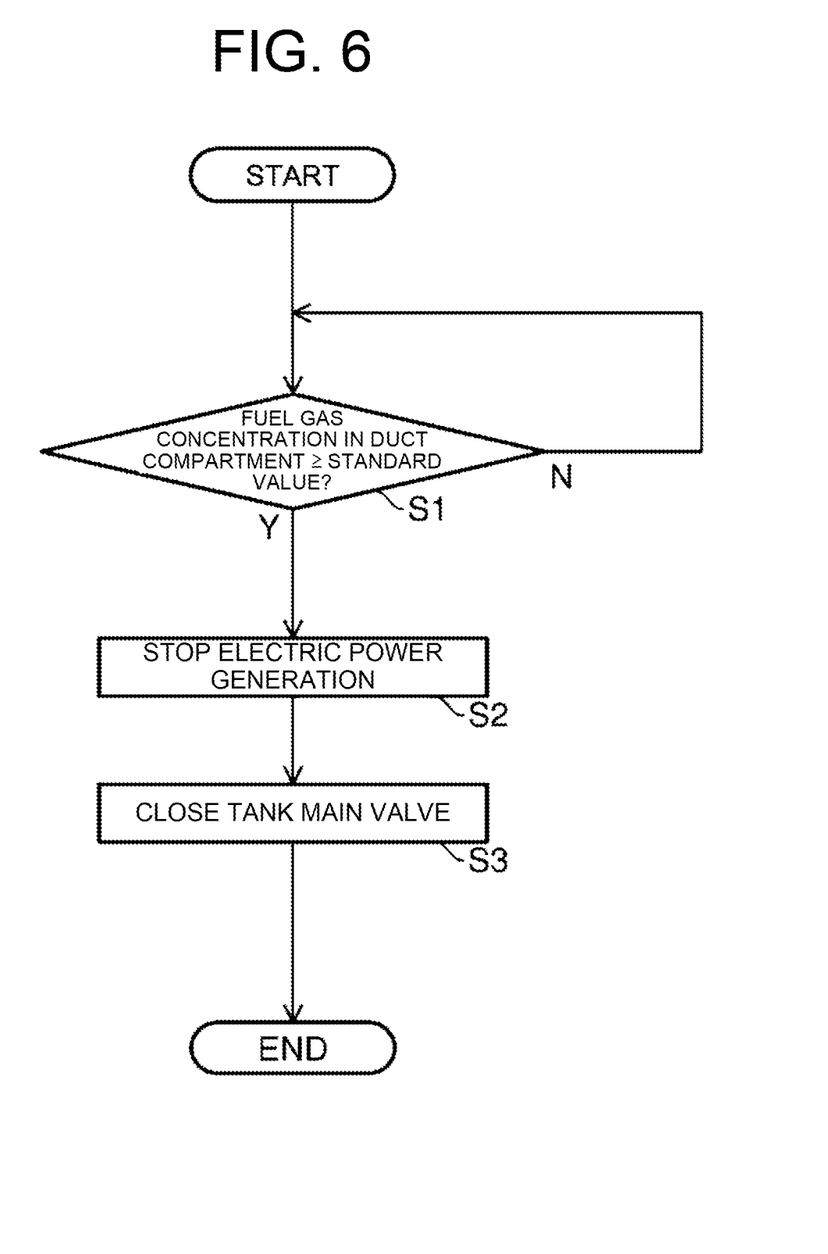
FIG. 6 is a flowchart of processing based on detection of a fuel gas in a duct compartment of the fuel cell ship.

FIG. 6 is a flowchart of processing based on detection of the fuel gas in the duct compartment 90. If the lower duct compartment internal gas detector 73 or the upper duct compartment internal gas detector 88 detects that the concentration of the fuel gas in the lower duct compartment 70 or the upper duct compartment 80 is equal to or higher than the standard value, and the detection signal is sent to the control unit 12*a* (S1), then the control unit 12*a* stops the driving of the fuel cell 31 to stop the electric power generation of the fuel cell 31 (S2). As the standard value, for example, 40% LEL can be considered, but the standard value may be appropriately determined based on experiments or experience.

Subsequently, the control unit 12*a* closes the main valve 41*a* of the fuel tank 41 (S3). As a result, the supply of fuel gas from the fuel tank 41 to the fuel cell 31 is stopped. In addition to closing the main valve 41*a*, the control unit 12*a* may also perform a control to close the shutoff valve SV (the tank side shutoff valve 43, the fuel cell side shutoff valve 33) provided in the fuel gas supply pipe 32.

As described above, the fuel cell ship SH includes the control unit 12*a* that controls the electric power generation of fuel cell 31. If the fuel gas detector (the upper duct compartment internal gas detector 88, the lower duct compartment internal gas detector 73) detects that the concentration of the fuel gas is equal to or higher than a predetermined standard value, the control unit 12*a* stops the electric power generation of the fuel cell 31 (S1, S2).

When a fuel gas leak equal to or higher than the standard value is detected in the duct compartment 90, the electric power generation of the fuel cell 31 can be safely stopped.

In particular, if the fuel gas detector detects that the concentration of the fuel gas is equal to or higher than the predetermined standard value, the control unit 12*a* closes the main valve 41*a* of the fuel tank 41 (S3). By closing the main valve 41*a*, the supply of fuel gas from the fuel tank 41 to the fuel cell 31 is stopped, and thus the electric power generation of the fuel cell 31 can be reliably stopped.

In the present embodiment, the fuel gas is used as the fuel supplied from the fuel tank 41 to the fuel cell 31, but the fuel is not limited to a gas and may be a liquid. When a liquid fuel is used, if the liquid fuel leaks from a pipe, the leaked liquid fuel vaporizes and becomes a gas (a fuel gas).

Embodiments of the present invention have been described above; however, the scope of the present invention is not limited to these embodiments, and can be extended or modified without departing from the gist of the invention.

INDUSTRIAL APPLICABILITY

The present invention can be used, for example, in a fuel cell ship.

REFERENCE SIGNS LIST

1 Hull
6 Propulsion device
10 Vent pipe
12*a* Control unit
30 Fuel cell compartment
31 fuel cell
32 Fuel gas supply pipe (fuel supply pipe)
40 Tank compartment
41 Fuel tank
41*a* Main valve
42 Gas filling pipe (fuel filling pipe)
70 Lower duct compartment (duct compartment)
71 Fuel gas discharge pipe
73 Lower duct compartment internal gas detector (Fuel gas detector)
75 Lower duct compartment air supply device (duct compartment air supply device)
80 Upper duct compartment (duct compartment)
82 Fuel gas filling port (fuel filling port)
84 Inert gas filling port
87 Inert gas pipe
88 Upper duct compartment internal gas detector (Fuel gas detector)
90 Duct compartment
92 Communication pipe
EM Electrical equipment
SH Fuel cell ship

The invention claimed is:

1. A fuel cell ship comprising:
   a fuel cell configured to generate electric power by an electrochemical reaction of fuel;
   a propulsion device configured to generate propulsive force on a hull by electric power supplied from the fuel cell;
   a fuel supply pipe configured to provide the fuel from a fuel tank housing the fuel to the fuel cell;
   a duct compartment that houses a part of the fuel supply pipe;
   a vent pipe configured to communicate with the duct compartment; and
   a fuel filling port configured as an inlet for filling the fuel tank with the fuel, and
   wherein the fuel filling port is provided in the duct compartment.

2. The fuel cell ship according to claim 1, further comprising:
   a fuel discharge pipe provided by branching from the fuel supply pipe; and
   a fuel filling pipe configured to connect the fuel filling port and the fuel tank, and
   wherein the duct compartment is configured to house the fuel discharge pipe and the fuel filling pipe.

3. The fuel cell ship according to claim 2, further comprising:
   an inert gas filling port configured as an inlet for filling the fuel tank with an inert gas; and
   an inert gas pipe connected to the inert gas filling port and the fuel filling pipe, wherein the duct compartment is further configured to house the inert gas pipe.

4. The fuel cell ship according to claim 1, further comprising:
   a fuel cell compartment installed with the fuel cell; and
   a communication pipe by which the fuel cell compartment is configured to communicate with the duct compartment.

5. The fuel cell ship according to claim 1, further comprising a tank compartment installed with the fuel tank, wherein the vent pipe is configured to communicate with both the duct compartment and the tank compartment.

6. The fuel cell ship according to claim 1, further comprising electrical equipment arranged around the duct compartment.

7. The fuel cell ship according to claim 6, wherein the electrical equipment includes a duct compartment air supply device configured to supply air to inside of the duct compartment.

8. The fuel cell ship according to claim 1, further comprising:
- a control unit configured to control electric power generation of the fuel cell, wherein:
- a fuel gas detector is configured to detect a fuel gas being the fuel in a gaseous state is installed inside the duct compartment, and
- based on detection by the fuel gas detector that a concentration of the fuel gas is equal to or greater than a predetermined standard value, the control unit is configured to stop the electric power generation of the fuel cell.

9. The fuel cell ship according to claim 8, wherein, based on detection by the fuel gas detector that the concentration of the fuel gas is equal to or greater than the predetermined standard value, the control unit is configured to close a main valve of the fuel tank.

\* \* \* \* \*